US008824786B2

(12) United States Patent
Itoh

(10) Patent No.: US 8,824,786 B2
(45) Date of Patent: Sep. 2, 2014

(54) IMAGE PROCESSING APPARATUS AND NON-TRANSITORY COMPUTER READABLE MEDIUM

(71) Applicant: Fuji Xerox Co., Ltd., Tokyo (JP)

(72) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 123 days.

(21) Appl. No.: 13/673,339

(22) Filed: Nov. 9, 2012

(65) Prior Publication Data

US 2013/0266216 A1 Oct. 10, 2013

(30) Foreign Application Priority Data

Apr. 6, 2012 (JP) ................................. 2012-087631

(51) Int. Cl.
| G06K 9/34 | (2006.01) |
|---|---|
| H04N 1/00 | (2006.01) |
| G06T 7/40 | (2006.01) |
| G06T 5/00 | (2006.01) |
| G06K 9/46 | (2006.01) |

(52) U.S. Cl.
CPC .. *G06T 5/00* (2013.01); *H04N 1/00* (2013.01); *G06T 2207/20012* (2013.01); *G06T 2207/10024* (2013.01); *G06T 7/408* (2013.01); *G06K 9/46* (2013.01)
USPC ........................................................ 382/164

(58) Field of Classification Search
None
See application file for complete search history.

(56) References Cited

U.S. PATENT DOCUMENTS

| 5,530,759 | A  | * | 6/1996  | Braudaway et al. ............ 380/54 |
| 5,875,249 | A  | * | 2/1999  | Mintzer et al. .................. 380/54 |
| 6,579,324 | B1 | * | 6/2003  | Lowry et al. .................. 715/243 |
| 6,978,042 | B1 | * | 12/2005 | Shin et al. ..................... 382/164 |
| 7,062,084 | B2 | * | 6/2006  | Messing et al. ............... 382/165 |
| 8,179,570 | B2 | * | 5/2012  | Zhao et al. ..................... 358/2.1 |
| 8,274,708 | B2 | * | 9/2012  | Takahashi .................... 358/3.28 |
| 8,284,451 | B2 | * | 10/2012 | Misawa et al. ................. 358/2.1 |
| 8,441,544 | B2 | * | 5/2013  | Minagawa et al. ......... 348/222.1 |
| 2003/0011684 | A1 | * | 1/2003 | Narayanaswami et al. ....................... 348/207.99 |
| 2010/0157377 | A1 | * | 6/2010 | Zhao et al. .................... 358/3.28 |
| 2010/0188521 | A1 | * | 7/2010 | Minagawa et al. ........ 348/222.1 |

FOREIGN PATENT DOCUMENTS

| JP | A-2002-33901 | 1/2002 |
| JP | A-2011-44919 | 3/2011 |

* cited by examiner

*Primary Examiner* — Bhavesh Mehta
*Assistant Examiner* — Feng Niu
(74) *Attorney, Agent, or Firm* — Oliff PLC

(57) ABSTRACT

An image processing apparatus includes a first extraction unit, a second extraction unit, a third extraction unit, a determination unit, a correction unit, and a color quantization unit. The first extraction unit extracts from an image a region and color of an information image. The second extraction unit extracts a color of a peripheral image surrounding the extracted region. The third extraction unit extracts information necessary for color quantization processing. The determination unit determines whether a color difference between the extracted color of the information image and the extracted color of the peripheral image falls within a predetermined range when color quantization processing is based on the extracted information. The correction unit corrects a representative color if it is determined that the color difference does not fall within the predetermined range. The color quantization unit performs color quantization processing on the image on the basis of the corrected representative color.

16 Claims, 9 Drawing Sheets

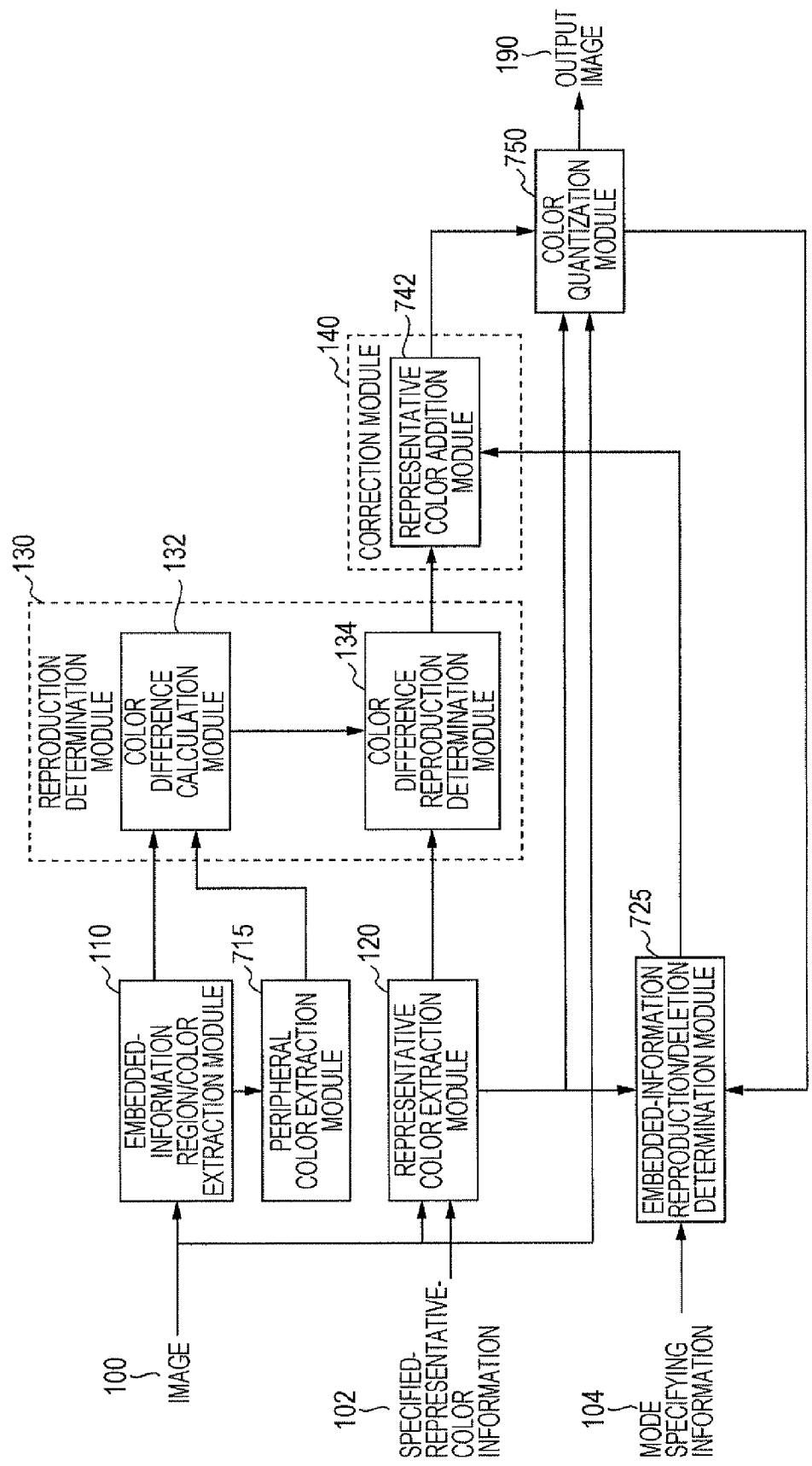

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-087631 filed Apr. 6, 2012.

BACKGROUND

Technical Field

The present invention relates to an image processing apparatus and a non-transitory computer readable medium.

SUMMARY

According to an aspect of the invention, there is provided an image processing apparatus including a first extraction unit, a second extraction unit, a third extraction unit, a determination unit, a correction unit, and a color quantization unit. The first extraction unit extracts from an image a region having an information image and a color of the information image, the information image representing information embedded in the image. The second extraction unit extracts a color of a peripheral image surrounding the region extracted by the first extraction unit. The third extraction unit extracts information necessary for color quantization processing to be performed on the image. The determination unit determines whether or not a color difference that is a difference between the color of the information image extracted by the first extraction unit and the color of the peripheral image extracted by the second extraction unit falls within a predetermined range when color quantization processing is based on the information extracted by the third extraction unit. The correction unit corrects a representative color if the determination unit determines that the color difference does not fall within the predetermined range, the representative color being representative of a color of an image that has been subjected to color quantization processing. The color quantization unit performs color quantization processing on the image on the basis of the representative color corrected by the correction unit.

BRIEF DESCRIPTION OF THE DRAWINGS

Exemplary embodiments of the present invention will be described in detail based on the following figures, wherein:

FIG. 7 is a conceptual module configuration diagram of an example configuration of an image processing apparatus according to a third exemplary embodiment;

DETAILED DESCRIPTION

Various exemplary embodiments of the present invention will be described hereinafter with reference to the drawings.

Figure 1:
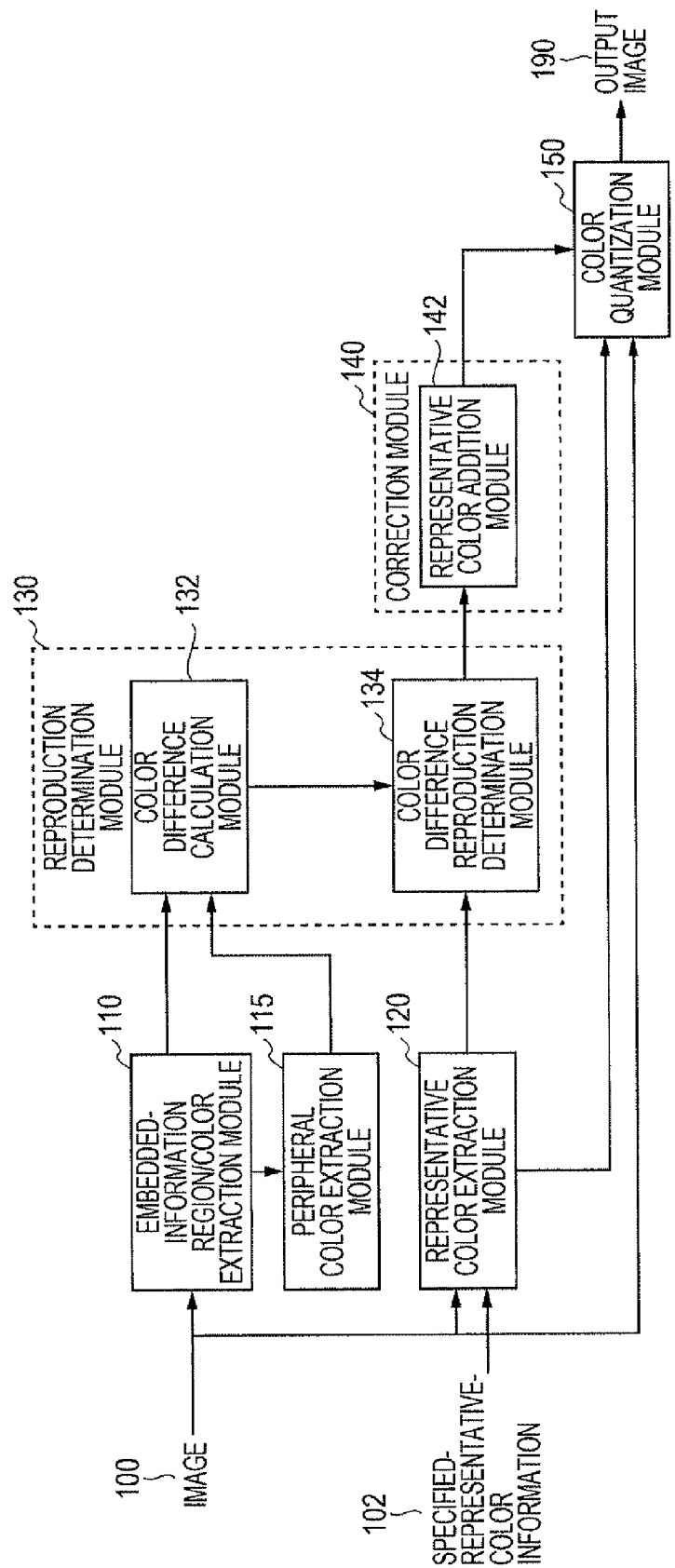
FIG. 1 is a conceptual module configuration diagram of an example configuration of an image processing apparatus according to a first exemplary embodiment.

FIG. 1 is a conceptual module configuration diagram of an example configuration of an image processing apparatus according to a first exemplary embodiment.

The term "module" generally refers to a logically separable part of software (computer program), hardware, or the like. Therefore, the term "module" as used in this exemplary embodiment refers to not only a module in a computer program but also a module in a hardware configuration. Thus, this exemplary embodiment will be described in the context of a computer program for providing functions of modules (a program for causing a computer to execute individual procedures, a program for causing a computer to function as individual units, and a program for causing a computer to realize individual functions), a system, and a method. While "storing", "being stored", and equivalent terms are used for convenience of description, such terms indicate, when the exemplary embodiment relates to a computer program, storing of the computer program in a storage device or performing of control to store the computer program in a storage device. Furthermore, modules and functions may have a one-to-one correspondence. In terms of implementation, one module may be composed of one program, plural modules may be composed of one program, or, conversely, one module may be composed of plural programs. Additionally, plural modules may be executed by a single computer, or a single module may be executed by plural computers in a distributed or parallel environment. One module may include another module. Further, hereinafter, the term "connection" includes physical connection and logical connection (such as exchanging data, issuing an instruction, and cross-reference between data items). The term "predetermined" means "determined before" the performance of a desired process, and is used to include "determined before" the start of a process according to the exemplary embodiment, and "determined before" the performance of a desired process even after the start of a process according to the exemplary embodiment, in accordance with the current state and condition or in accordance with the previous state and condition. If plural "predetermined values" are used, the values may be different from each other or two or more values (or all the values) may be the same. The phrase "if A, then B" or words of similar meaning means that "it is determined whether or not A, and B if it is determined that A" unless the determination of whether or not A is required.

Furthermore, the term "system" or "apparatus" is used to include a configuration in which plural computers, hardware components, devices, or other suitable elements are connected to one another via a communication medium such as a network (including a one-to-one communication setup), and what is implemented by a single computer, hardware component, device, or suitable element. The terms "apparatus", "device", and "system" are used synonymously. It is to be understood that the term "system" does not include what is merely a social "mechanism" (social system) based on artificial rules.

Moreover, desired information is read from a storage device for each process performed by an individual module or, if plural processes are performed within a module, for each of the plural processes, and is processed. The process result is written in the storage device. Therefore, reading of information from the storage device before the processing of the information and writing of information to the storage device after the processing of the information may not necessarily be described herein. The term "storage device", as used herein, may include a hard disk, a random access memory (RAM), an external storage medium, a storage device using a communication line, and a register in a central processing unit (CPU).

The image processing apparatus according to the first exemplary embodiment is configured to perform color quantization on an image including an information image to display the image in a limited number of distinct colors (hereinafter referred to as "color quantization processing"). As in the example illustrated in FIG. 1, the image processing apparatus includes an embedded-information region/color extraction module 110, a peripheral color extraction module 115, a representative color extraction module 120, a reproduction determination module 130, a correction module 140, and a color quantization module 150.

The information image refers to an image code systematically created to express electronic data in a machine-readable manner, and includes, for example, a tracking pattern including information for specifying an image forming apparatus that has output (e.g., printed or copied) the image. The information image may be an invisible information image or an equivalent thereto. The invisible information image or the equivalent thereto refers to an information image that is indistinguishable or difficult to distinguish by the naked eye or a similar information image, that is, an information image with low perceptibility (or less discernible). For example, an information image is output using yellow toner. Note that an information image is also referred to as embedded information.

This exemplary embodiment may be used for the color quantization of an image on which an information image is superimposed. In this exemplary embodiment, it is determined whether or not a color difference between a color of the information image and a peripheral color surrounding the color of the information image in a region where the information image is superimposed is appropriate to quantize colors to levels that allow the information image to be detected although the perceptibility of the information image is still low. If it is determined that the color difference is not appropriate to quantize colors to such levels, a representative color of the superimposed region is selected again or a representative color is added.

The embedded-information region/color extraction module 110 is connected to the peripheral color extraction module 115 and a color difference calculation module 132. The embedded-information region/color extraction module 110 receives an image 100, and extracts from the image 100 a region having an information image indicating information embedded in the image 100, and a color of the information image. The term "region having an information image" refers to a region constituted by one or more pixels. Note that a region having an information image is also referred to as an embedded-information region. A region having an information image will be described below with reference to FIG. 3.

The peripheral color extraction module 115 is connected to the embedded-information region/color extraction module 110 and the color difference calculation module 132. The peripheral color extraction module 115 extracts a color of a peripheral image surrounding the region extracted by the embedded-information region/color extraction module 110. Note that the peripheral image is also referred to as a peripheral background region and a color of the peripheral image is also referred to as a peripheral background color.

Figure 3:
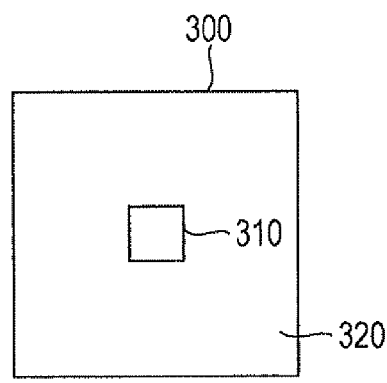
FIG. 3 illustrates an example relationship between an embedded-information region and a peripheral background region in a local region.

An example relationship between an embedded-information region 310 and a peripheral background region 320 in a local region 300 will be described with reference to FIG. 3. The embedded-information region 310 is a region where it is predicted that an information image is located. The embedded-information region 310 may have a size of one or more pixels. The local region 300 is a region having a predetermined size. In FIG. 3, the local region 300 is, for example but not limited to, rectangular. The local region 300 may also be formed into any other shape such as a hexagon or an ellipse (including a circle). The local region 300 may have a size that includes one or more embedded-information regions 310, and may also include a background of the embedded-information region or regions 310. In FIG. 3, furthermore, the embedded-information region 310 is located at the center of the local region 300, but may not necessarily be located at the center of the local region 300. The shape of the embedded-information region 310 is not limited to a square, and may be a rectangle, an L-shaped polygon, or the like. The peripheral background region 320 is a region where the embedded-information region 310 is excluded from the local region 300. The embedded-information region/color extraction module 110 processes the embedded-information region 310, and the peripheral color extraction module 115 processes the peripheral background region 320.

The representative color extraction module 120 is connected to a color difference reproduction determination module 134 and the color quantization module 150. The representative color extraction module 120 receives the image 100 and specified-representative-color information 102, and extracts information necessary for color quantization processing to be performed on the image 100. The specified-representative-color information 102 may be the value of a representative color (converted color obtained after color quantization processing is performed) or the number of representative colors. The value of a representative color includes a color range. If the specified-representative-color information 102 is the number of representative colors, the representative color extraction module 120 extracts representative colors from the image 100. For example, the representative color extraction module 120 performs processing such as assigning representative colors to colors used in the image 100 in descending order from the most frequently used color (the largest number of pixels having the color).

The reproduction determination module 130 determines whether or not the representative colors include a representative color that lies within a predetermined color distance range in a predetermined color direction from the peripheral background color. The reproduction determination module 130 includes the color difference calculation module 132 and the color difference reproduction determination module 134.

The color difference calculation module 132 is connected to the embedded-information region/color extraction module 110, the peripheral color extraction module 115, and the color difference reproduction determination module 134. The color difference calculation module 132 calculates a color difference that is the difference between the color of the information image extracted by the embedded-information region/color extraction module 110 and the color of the peripheral image extracted by the peripheral color extraction module 115. Here, the color difference is represented by a vector.

More specifically, in a color space, the vector drawn from the position of the color of the information image to the position of the color of the peripheral image (or the vector drawn from the position of the color of the peripheral image to the position of the color of the information image) represents the color difference. Accordingly, a color-difference direction corresponds to the orientation of the vector.

The color difference reproduction determination module 134 is connected to the representative color extraction module 120, the color difference calculation module 132, and a representative color addition module 142. When color quantization processing is based on the information extracted by the representative color extraction module 120, the color difference reproduction determination module 134 determines whether or not the color difference calculated by the color difference calculation module 132 (the color difference that is the difference between the color of the information image extracted by the embedded-information region/color extraction module 110 and the color of the peripheral image extracted by the peripheral color extraction module 115) falls within a predetermined range.

The predetermined range used by the color difference reproduction determination module 134 may be defined by the following regions: a region that extends from the color of the peripheral image up to a distance greater than a first distance or up to a distance greater than or equal to the first distance, the first distance being determined in advance in the color-difference direction; a region that extends from the color of the peripheral image up to a distance less than a second distance or up to a distance less than or equal to the second distance, the second distance being determined in advance in the color-difference direction; and a region that extends from the color of the peripheral image up to a distance less than a third distance or up to a distance less than or equal to the third distance, the third distance being determined in advance in the color-difference direction.

Figure 4:
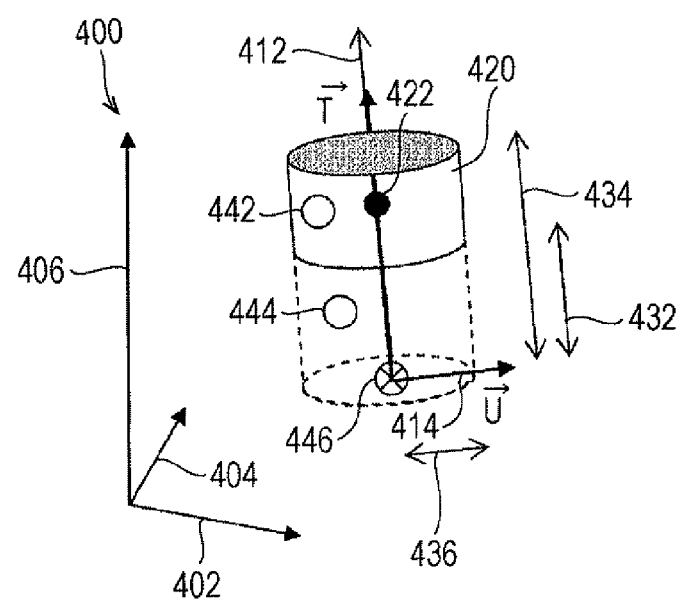
FIG. 4 illustrates example processing according to the first exemplary embodiment.

This will be described with reference to FIG. 4. FIG. 4 illustrates example processing according to the first exemplary embodiment. More specifically, FIG. 4 illustrates an example in which it is determined whether or not a color difference between a color of an embedded-information region (region having an information image) and a color of a peripheral background region (peripheral image) lies within a predetermined range.

The predetermined range is a region that satisfies all the following conditions:

(1) A region that extends from a peripheral background region color (representative color) 446 up to a distance greater than a color-difference distance 432 or up to a distance greater than or equal to the color-difference distance 432 in a color-difference direction 412.

(2) A region that extends from the peripheral background region color (representative color) 446 up to a distance less than a color-difference distance 434 or up to a distance less than or equal to the color-difference distance 434 in the color-difference direction 412.

(3) A region that extends from the peripheral background region color (representative color) 446 up to a distance less than a color-difference distance 436 or up to a distance less than or equal to the color-difference distance 436 in the color-difference direction 412 and in a vertical direction 414 perpendicular to the color-difference direction 412.

In the example illustrated in FIG. 4, the predetermined range is a range 420.

A color space 400 is, by way of example, a space defined by an x-axis 402, a y-axis 404, and a z-axis 406.

As used here, the color difference is a vector drawn from the peripheral background region color (representative color) 446 to a center color 422 in the range 420. The vertical direction 414 is a set of vectors perpendicular to the color-difference direction 412. Since the peripheral background region color (representative color) 446, which is a representative color, is a representative color of the background, there is generally no difference between a peripheral background color and its corresponding representative color. Examples of the peripheral background color include a plain color, a color whose lightness is higher than a predetermined threshold value or is higher than or equal to the predetermined threshold value, a ground color, and a white color, and the color does not change before and after the color quantization processing (or changes negligibly).

If the color of the embedded information is included in the range 420, information is readable from the embedded information. That is, the color difference between the color of the embedded information and the peripheral background color is appropriate.

An embedded-information-region color 442 is included in the range 420, and an embedded-information-region color 444 is not included in the range 420. For example, if a representative color corresponding to the color of the embedded information (to which the color of the embedded information has been quantized (color quantization processing)) is located at the position of the embedded-information-region color 442, information is readable from the embedded information. In contrast, if the representative color corresponding to the color of the embedded information is located at the position of the embedded-information-region color 444, it is difficult to read information from the embedded information.

The correction module 140 includes the representative color addition module 142.

The representative color addition module 142 is connected to the color difference reproduction determination module 134 and the color quantization module 150. If the color difference reproduction determination module 134 determines that the color difference calculated by the color difference calculation module 132 does not fall within the predetermined range, the representative color addition module 142 corrects the representative color that is a color representative of an image that has been subjected to color quantization processing. Needless to say, in the example illustrated in FIG. 4, the predetermined range is the range 420.

The representative color addition module 142 may also add a representative color to the colors in the predetermined range.

The representative color addition module 142 may also change a representative color that is at a short distance from the predetermined range (e.g., the representative color that is at the shortest distance) to a color in the predetermined range.

Alternatively, if a representative color is included in a second range larger than the predetermined range by a given value, the representative color addition module 142 may change a representative color that is at a short distance from the predetermined range to a color in the predetermined range. The term "given value" refers to a predetermined distance, and the second range is a range larger than the predetermined range and may be created by equally increasing the size of the predetermined range or by increasing the size of the predetermined range in a predetermined direction (including plural directions). If no representative colors are included in the second range, a representative color may be added to the colors in the predetermined range.

The representative color addition module 142 may also correct a representative color only in a region having an information image. In this case, the corrected representative color is not used in a region other than the region including the information image. In addition, when a representative color is to be added, the added representative color may be referred to only for a region having an information image.

If there is an upper limit on the number of representative colors (e.g., there is a limit up to 255 representative colors), the representative color addition module 142, when adding a representative color, may select a representative color to be excluded and exclude the selected representative color. That is, some of the representative colors are changed, and the representative color addition module 142 selects the representative colors to be changed.

The representative color addition module 142 may also select, as a representative color to be excluded, a representative color that is a representative color other than a representative color to be added and other than a representative color of a peripheral image and that is a representative color for which the color difference between the colors before and after the color quantization processing is the smallest. The term "representative color to be excluded" refers to a representative color to be changed. Note that the "representative color to be added" is generally a representative color corresponding to a color of an information image (the color extracted by the embedded-information region/color extraction module 110). The term "representative color of a peripheral image" refers to a representative color corresponding to the color extracted by the representative color extraction module 120. Accordingly, the term "representative color other than a representative color to be added and other than a representative color of a peripheral image" refers to a representative color other than the representative color corresponding to the color extracted by the embedded-information region/color extraction module 110 and also other than the representative color corresponding to the color extracted by the representative color extraction module 120. Thus, information is made readable from the information image after the image 100 has been subjected to color quantization processing. Further, the term "representative color for which the difference between the colors before and after the color quantization processing is the smallest" refers to a representative color for which the difference (called an error) between the target color and the color obtained after color quantization processing has been performed (i.e., the representative color) is the smallest.

The representative color addition module 142 may also select, as a representative color to be excluded, a representative color that is a representative color other than a representative color to be added and other than a representative color of a peripheral image and that is a representative color used infrequently after the color quantization processing (e.g., the representative color used least frequently). The "representative color used infrequently after the color quantization processing" is selected as the representative color to be excluded because it is desirable that a color that may appear inconspicuous in an image that has been subjected to color quantization processing (e.g., the representative color used least frequently) be changed.

The representative color addition module 142 may also select, as a representative color to be excluded, a representative color that is a representative color other than a representative color to be added and other than a representative color of a peripheral image and that is a representative color close (e.g., the representative color that is the closest) to the representative color to be added. The "representative color close to the representative color to be added" is selected as the representative color to be excluded because it is desirable that a color (a representative color similar to the added representative color) that may appear inconspicuous when changed to the added representative color be changed.

The color quantization module 150 is connected to the representative color extraction module 120 and the representative color addition module 142. The color quantization module 150 receives the image 100, and performs color quantization processing on the image 100 on the basis of the representative color corrected by the representative color addition module 142. The color quantization module 150 then outputs an output image 190 (the image 100 that has been subjected to color quantization processing). The color quantization processing may be performed using a technique of the related art (also referred to as the subtractive process or the like).

Figure 2:
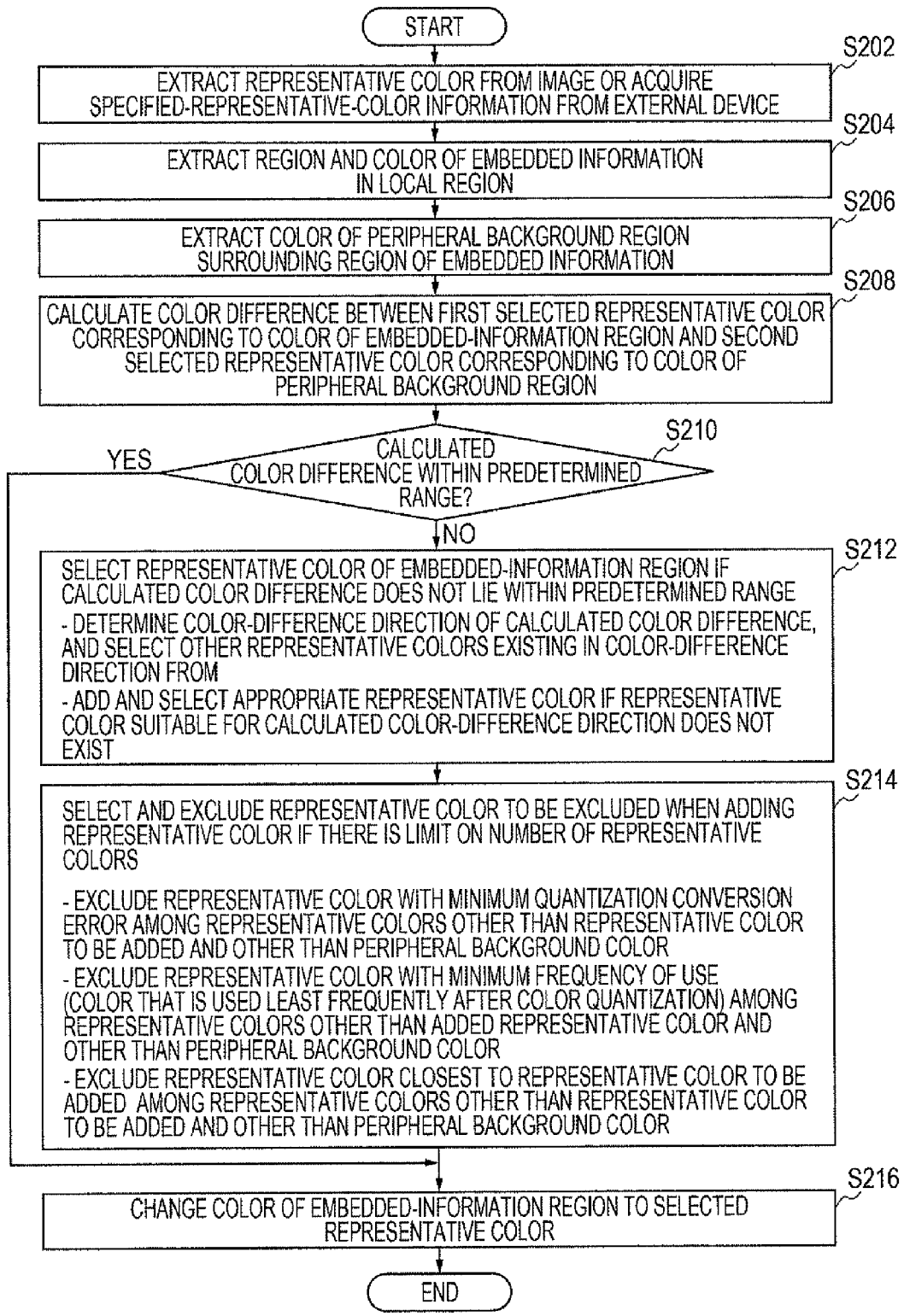
FIG. 2 is a flowchart illustrating example processing according to the first exemplary embodiment.

FIG. 2 is a flowchart illustrating example processing according to the first exemplary embodiment.

In step S202, the representative color extraction module 120 extracts a representative color from a received image. Alternatively, the representative color extraction module 120 acquires specified-representative-color information from an external device.

In step S204, the embedded-information region/color extraction module 110 extracts a region and color of embedded information in a local region.

In step S206, the peripheral color extraction module 115 extracts a color of a peripheral background region surrounding the region of the embedded information.

In step S208, the color difference calculation module 132 calculates a color difference between a first selected representative color (which is a color obtained after color quantization processing has been performed on the color of the embedded-information region) corresponding to the color of the embedded-information region and a second selected representative color (which is a color obtained after color quantization processing has been performed on the color of the peripheral background region) corresponding to the color of the peripheral background region.

In step S210, the color difference reproduction determination module 134 determines whether or not the color difference calculated in step S208 lies within a predetermined range. If the color difference lies within the predetermined range, the process proceeds to step S216, or the process proceeds to step S212 otherwise.

In step S212, if the calculated color difference does not lie within the predetermined range, the representative color addition module 142 selects a representative color of the embedded-information region. For example, the representative color addition module 142 performs any of the following processing operations:

(A1) Determining a color-difference direction of the calculated color difference, and selecting other representative colors existing in the color-difference direction from the peripheral background region. In the example illustrated in FIG. 4, if the first selected representative color is not included in the range 420, a representative color in the range 420 is selected.

(A2) if a representative color suitable for the color-difference direction of the calculated color difference does not exist, adding and selecting an appropriate representative color. In the example illustrated in FIG. 4, if no representative colors are included in the range 420, for example, the center color 422 in the range 420 is selected as a representative color. In addition, if no representative colors are included in the range 420 and if a representative color exists in a range (the second range described above) larger than the range 420 by a predetermined value, a representative color that is at a short distance from the range 420 (e.g., the closest representative color) may be changed to a color in the range 420. If no representative colors are in the range larger than the range 420 by the predetermined value, a representative color may be added in the range 420.

In step S214, if there is a limit on the number of representative colors, the representative color addition module 142, when adding a representative color, selects a representative color to be excluded and excludes the selected representative color. For example, the representative color addition module 142 performs any of the following processing operations:

(B1) Excluding a representative color with a minimum quantization conversion error among representative colors other than the representative color to be added and other than the peripheral background color. A representative color with a minimum difference between the colors before and after the color quantization processing described above is selected.

(B2) Excluding a representative color with a minimum frequency of use (color that is used least frequently after the color quantization) among representative colors other than the representative color to be added and other than the peripheral background color.

(B3) Excluding the representative color closest to the representative color to be added among representative colors other than the representative color to be added and other than the peripheral background color.

In step S216, the color quantization module 150 changes the color of the embedded-information region to the selected representative color.

Figure 5:
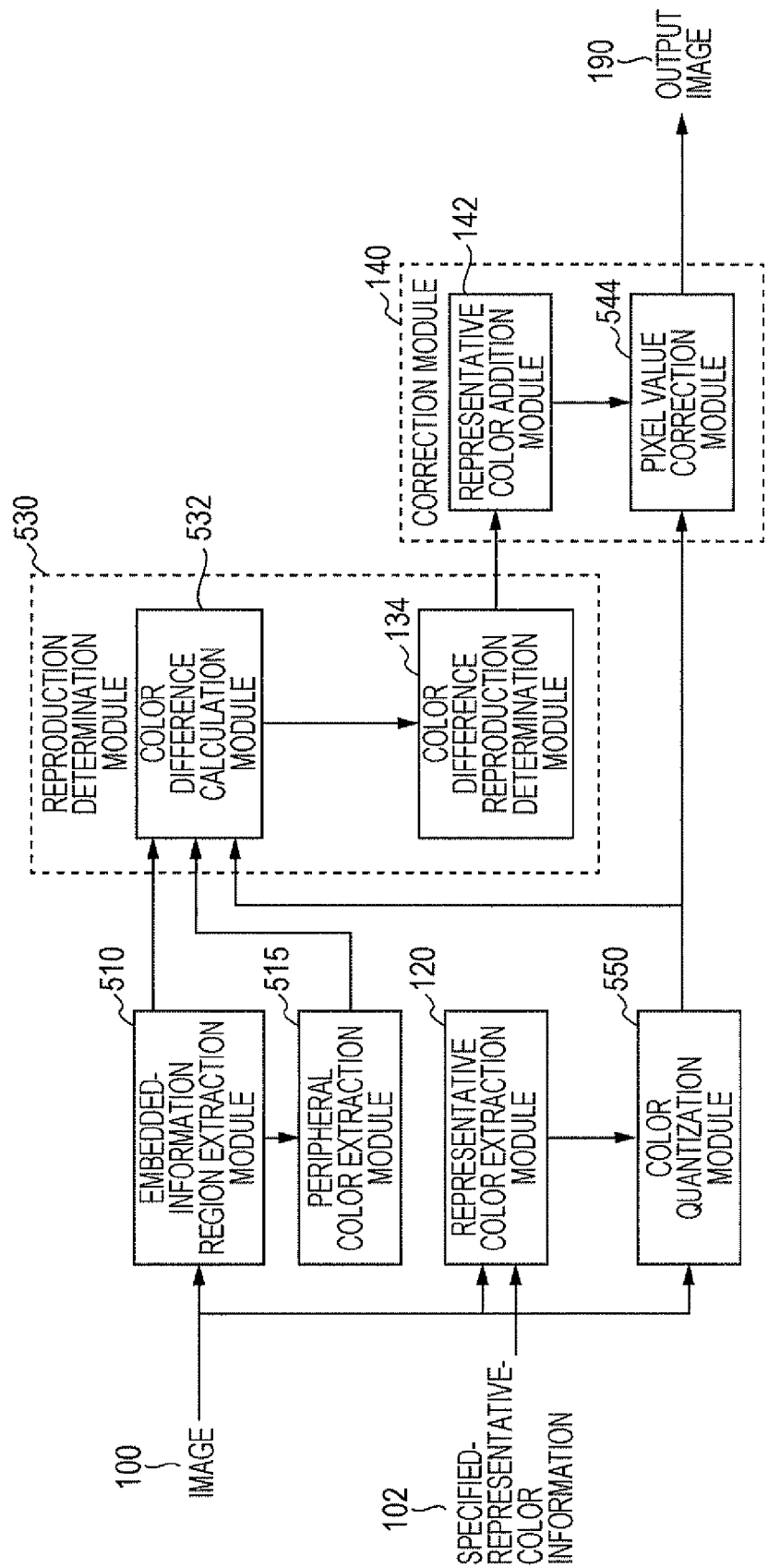
FIG. 5 is a conceptual module configuration diagram of an example configuration of an image processing apparatus according to a second exemplary embodiment.

FIG. 5 is a conceptual module configuration diagram of an example configuration of an image processing apparatus according to a second exemplary embodiment.

The image processing apparatus according to the second exemplary embodiment is configured to perform color quantization processing on an image including an information image. As illustrated in the example in FIG. 5, the image processing apparatus includes an embedded-information region extraction module 510, a peripheral region extraction module 515, a representative color extraction module 120, a reproduction determination module 530, a correction module 140, and a color quantization module 550. Portions substantially the same as those in the first exemplary embodiment are assigned the same numerals and a redundant description thereof is omitted (the same applies to the following exemplary embodiments). In the second exemplary embodiment, the color difference reproduction determination module 134 performs determination processing after the color quantization processing is performed, and an image subjected to color quantization processing is corrected.

The embedded-information region extraction module 510 is connected to a peripheral region extraction module 515 and a color difference calculation module 532. The embedded-information region extraction module 510 receives an image 100, and extracts from the image 100 a region having an information image representing information embedded in the image 100. That is, the embedded-information region/color extraction module 110 according to the first exemplary embodiment extracts a region having an information image and a color of the information image, whereas the embedded-information region extraction module 510 extracts a region having an information image.

The peripheral region extraction module 515 is connected to the embedded-information region extraction module 510 and a color difference calculation module 532. The peripheral region extraction module 515 extracts a peripheral region surrounding the region extracted by the embedded-information region extraction module 510. That is, the peripheral color extraction module 115 according to the first exemplary embodiment extracts a color of a peripheral image surrounding the region extracted by the embedded-information region/color extraction module 110, whereas the peripheral region extraction module 515 extracts the peripheral region.

The representative color extraction module 120 is connected to a color quantization module 550.

The color quantization module 550 is connected to the representative color extraction module 120, the color difference calculation module 532, and a pixel value correction module 544. The color quantization module 550 receives the image 100, and performs color quantization processing on the image 100 in accordance with the information extracted by the representative color extraction module 120.

The reproduction determination module 530 includes the color difference calculation module 532 and the color difference reproduction determination module 134.

The color difference calculation module 532 is connected to the embedded-information region extraction module 510, the peripheral region extraction module 515, the color quantization module 550, and the color difference reproduction determination module 134. The color difference calculation module 532 calculates a color difference that is a difference between a color of the region of the information image extracted by the embedded-information region extraction module 510 and a color of the peripheral region extracted by the peripheral region extraction module 515 in the image subjected to color quantization processing by the color quantization module 550. That is, the color difference calculation module 132 according to the first exemplary embodiment calculates a color difference between the color of the information image extracted by the embedded-information region/color extraction module 110 and the color of the peripheral image extracted by the peripheral color extraction module 115, whereas the color difference calculation module 532 calculates a color difference between a color of the information image and a color of the peripheral image in the image subjected to color quantization processing by the color quantization module 550.

The color difference reproduction determination module 134 is connected to the color difference calculation module 532 and the representative color addition module 142. The color difference reproduction determination module 134 determines whether or not the color difference calculated by the color difference calculation module 532 (color difference between the color of the region of the information image extracted by the embedded-information region extraction module 510 and the color of the peripheral region extracted by the peripheral region extraction module 515 in the image subjected to color quantization processing by the color quantization module 550) falls within a predetermined range.

The correction module 140 includes the representative color addition module 142 and the pixel value correction module 544.

The representative color addition module 142 is connected to the color difference reproduction determination module 134 and the pixel value correction module 544.

The pixel value correction module 544 is connected to the representative color addition module 142 and the color quantization module 550. The pixel value correction module 544 corrects the image that has been subjected to color quantization processing by the color quantization module 550, in accordance with the representative color corrected by the representative color addition module 142, and outputs an output image 190 that is the corrected image. That is, in the image that has been subjected to color quantization processing, the representative color obtained before the representative color addition module 142 performs correction may be changed to a representative color obtained after correction.

Figure 6:
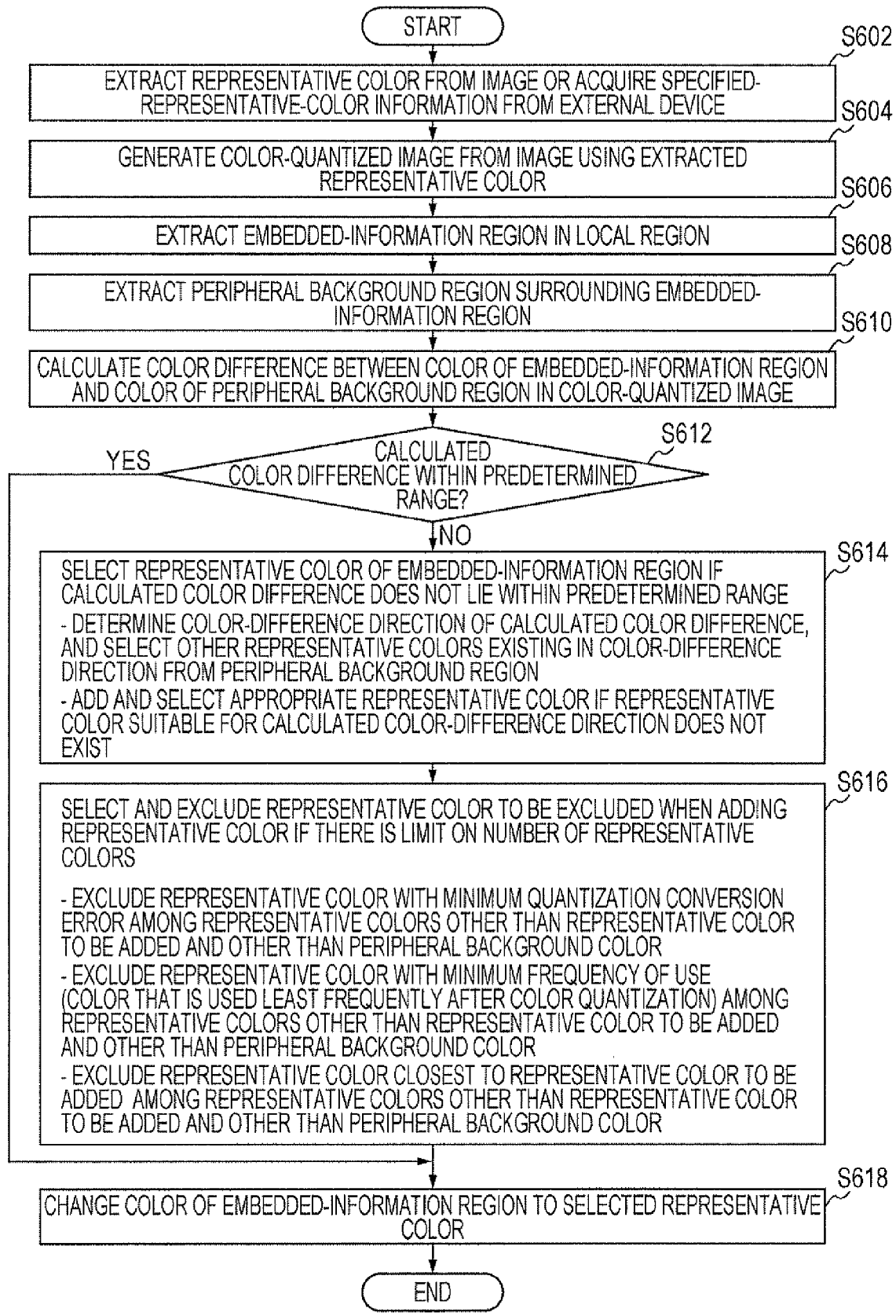
FIG. 6 is a flowchart illustrating example processing according to the second exemplary embodiment.

FIG. 6 is a flowchart illustrating example processing according to the second exemplary embodiment.

In step S602, the representative color extraction module 120 extracts a representative color from an image. Alternatively, the representative color extraction module 120 acquires specified-representative-color information from an external device.

In step S604, the color quantization module 550 generates a color-quantized image from the image using the extracted representative color.

In step S606, the embedded-information region extraction module 510 extracts an embedded-information region in a local region.

In step S608, the peripheral region extraction module 515 extracts a peripheral background region surrounding the embedded-information region.

In step S610, the color difference calculation module 532 calculates a color difference between a color of the embedded-information region and a color of the peripheral background region in the color-quantized image.

In step S612, the color difference reproduction determination module 134 determines whether or not the calculated color difference lies within a predetermined range. If the calculated color difference lies within the predetermined range, the process proceeds to step S618, or the process proceeds to step S614 otherwise.

In step S614, if the calculated color difference does not lie within the predetermined range, the representative color addition module 142 selects a representative color of the embedded-information region. For example, the representative color addition module 142 performs any of the following processing operations:

(A1) Determining a color-difference direction of the calculated color difference, and selecting other representative colors existing in the color-difference direction from the peripheral background region.

(A2) If a representative color suitable for the color-difference direction of the calculated color difference does not exist, adding and selecting an appropriate representative color.

In step S616, if there is a limit on the number of representative colors, the representative color addition module 142, when adding a representative color, selects a representative color to be excluded and excludes the selected representative color. For example, the representative color addition module 142 performs any of the following processing operations:

(B1) Excluding a representative color with a minimum quantization conversion error among representative colors other than the representative color to be added and other than the peripheral background color.

(B2) Excluding a representative color with a minimum frequency of use (color that is used least frequently after the color quantization) among representative colors other than the representative color to be added and other than the peripheral background color.

(B3) Excluding the representative color closest to the representative color to be added among representative colors other than the representative color to be added and other than the peripheral background color.

In step S618, the pixel value correction module 544 changes the color of the embedded-information region to the selected representative color.

FIG. 7 is a conceptual module configuration diagram of an example configuration of an image processing apparatus according to a third exemplary embodiment.

The image processing apparatus according to the third exemplary embodiment is configured to perform color quantization processing on an image including an information image. As illustrated in the example in FIG. 7, the image processing apparatus includes the embedded-information region/color extraction module 110, a peripheral color extraction module 715, the representative color extraction module 120, an embedded-information reproduction/deletion determination module 725, the reproduction determination module 130, the correction module 140, and a color quantization module 750. In the third exemplary embodiment, it is determined whether or not color quantization processing suitable for the processing according to the first exemplary embodiment described above is to be performed, and the processing according to the first exemplary embodiment is performed on a portion where the peripheral background color satisfies a predetermined condition. The processing according to the third exemplary embodiment may also be applied to the second exemplary embodiment.

The embedded-information region/color extraction module 110 is connected to the peripheral color extraction module 715 and the color difference calculation module 132.

The peripheral color extraction module 715 is connected to the embedded-information region/color extraction module 110 and the color difference calculation module 132. If the extracted peripheral image satisfies at least one of the conditions of having a plain color, having a lightness that is greater than a predetermined threshold value or is greater than or equal to the predetermined threshold value, having a ground color, and having a white color, the peripheral color extraction module 715 extracts a color of the peripheral image. That is, an information image included in a picture pattern region is not to be subjected to processing. The determination of a plain color may be performed by determining whether or not the difference in the peripheral image is less than a predetermined threshold value or is less than or equal to the predetermined threshold value. The determination of a ground color may be performed by determining whether or not the ratio of the extracted color of the peripheral image to the image is greater than a predetermined threshold value or is greater than or equal to the predetermined threshold value. The white color includes a pure white color and a color in a predetermined range with respect to the pure white color.

If the extracted peripheral image is an image having a color having a small number of predetermined color components, the peripheral color extraction module 715 may extract a color of the peripheral image. For example, if the embedded information represents the Y components, the correction according to this exemplary embodiment is performed when the peripheral color has a small number of Y components or no Y components. In general, the Y color plate is printed with a screen structure, and is scanned at a high resolution to resolve the Y screen structure so that each cell of the Y screen (each grain of the screen) is not subjected to correction according to this exemplary embodiment. The term "color having a small number of predetermined color components" is used to mean a color for which the number of predetermined color components is less than a predetermined threshold value or is less than or equal to the predetermined threshold value.

The representative color extraction module 120 is connected to the embedded-information reproduction/deletion determination module 725, the color difference reproduction determination module 134, and the color quantization module 750. The representative color extraction module 120 receives the image 100 and the specified-representative-color information 102.

The reproduction determination module 130 includes the color difference calculation module 132 and the color difference reproduction determination module 134.

The color difference calculation module 132 is connected to the embedded-information region/color extraction module 110, the peripheral color extraction module 715, and the color difference reproduction determination module 134.

The color difference reproduction determination module 134 is connected to the representative color extraction module 120, the color difference calculation module 132, and a representative color addition module 742.

The correction module 140 includes the representative color addition module 742.

The embedded-information reproduction/deletion determination module 725 is connected to the representative color extraction module 120, the representative color addition module 742, and the color quantization module 750. The embedded-information reproduction/deletion determination module 725 receives mode specifying information 104. The embedded-information reproduction/deletion determination module 725 does not cause the representative color addition module 742 to correct a representative color, and interpolates a region having an information image in the image 100 with a color of the peripheral image if at least one of the following conditions is satisfied: (1) the condition where the number of representative colors is less than a predetermined threshold value or is less than or equal to the predetermined threshold value; (2) the condition where the difference between the colors before and after the color quantization processing is larger than a predetermined threshold value or is larger than or equal to the predetermined threshold value; and (3) the condition where the color quantization processing is processing for quantization to black and white. The above-described operation is performed in a case where it is not appropriate to save an information image by performing color quantization processing, for example, in a case where the information image no longer has low perceptibility. In this case, the embedded-information reproduction/deletion determination module 725 deletes the information image (or makes the color of the information image the same as the color of the peripheral image) without causing the representative color addition module 742 to correct a representative color. The mode specifying information 104 may include information indicating that the color quantization processing is processing for quantization to black and white.

The representative color addition module 742 is connected to the color difference reproduction determination module 134, the embedded-information reproduction/deletion determination module 725, and the color quantization module 750. The representative color addition module 742 performs processing equivalent to that of the representative color addition module 142 according to the first exemplary embodiment. In some cases, however, the representative color addition module 742 may not correct a representative color under control of the embedded-information reproduction/deletion determination module 725.

The color quantization module 750 is connected to the representative color extraction module 120, the embedded-information reproduction/deletion determination module 725, and the representative color addition module 742. The color quantization module 750 receives the image 100, and performs color quantization processing on the image 100 in accordance with a determination result of the embedded-information reproduction/deletion determination module 725 on the basis of the representative color corrected by the representative color addition module 742 or the representative color extracted by the representative color extraction module 120. The color quantization module 150 then outputs an output image 190 (the image 100 that has been subjected to color quantization processing).

Figure 8A:
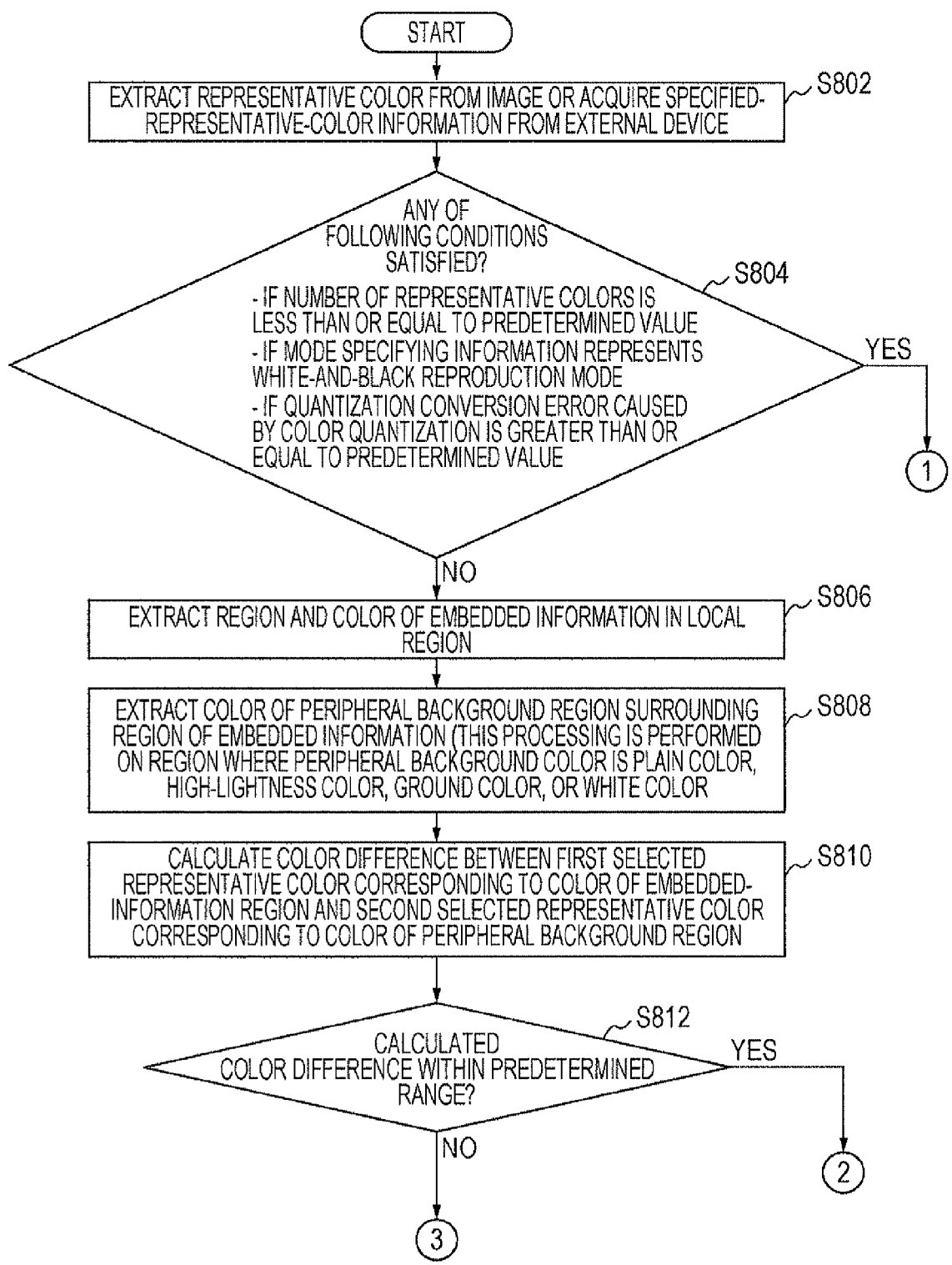
FIGS. 8A and 8B are parts of a flowchart illustrating example processing according to the third exemplary embodiment.
Figure 8B:
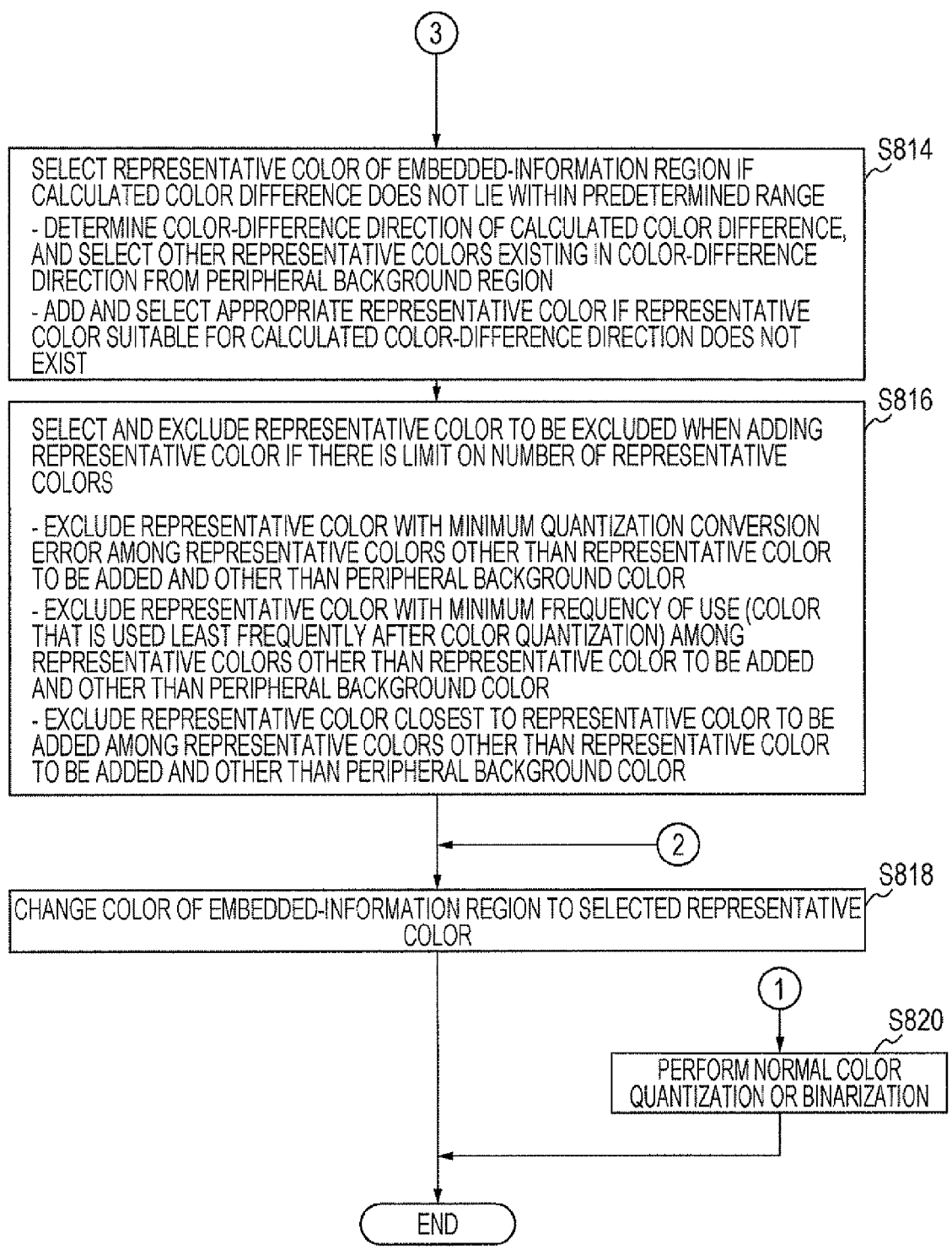

FIGS. 8A and 8B are parts of a flowchart illustrating example processing according to the third exemplary embodiment.

In step S802, the representative color extraction module 120 extracts a representative color from an image. Alternatively, the representative color extraction module 120 acquires specified-representative-color information from an external device.

In step S804, the embedded-information reproduction/deletion determination module 725 determines whether or not any of the following conditions is satisfied.

(C1) if the number of representative colors is less than a predetermined value or is less than or equal to the predetermined value.

(C2) If the mode specifying information represents a white-and-black reproduction mode (if representative colors in the color quantization processing are white and color).

(C3) If a quantization conversion error caused by color quantization is greater than a predetermined value or is greater than or equal to the predetermined value.

If any of the following conditions is satisfied, the process proceeds to step S820, or the process proceeds to step S806 otherwise.

In step S806, the embedded-information region/color extraction module 110 extracts a region and color of embedded information in a local region.

In step S808, the peripheral color extraction module 715 extracts a color of a peripheral background region surrounding the region of the embedded information. The processing of step S810 is performed on a region in which the peripheral background color is a plain color, a high-lightness color, a ground color, or a white color.

In step S810, the color difference calculation module 132 calculates a color difference between a first selected representative color corresponding to the color of the embedded-information region and a second selected representative color corresponding to the color of the peripheral background region.

In step S812, the color difference reproduction determination module 134 determines whether or not the calculated color difference lies within a predetermined range. If the calculated color difference lies within the predetermined range, the process proceeds to step S818, or the process proceeds to step S814 otherwise.

In step S814, if the calculated color difference does not lie within the predetermined range, the representative color addition module 742 selects a representative color of the embedded-information region. For example, the representative color addition module 742 performs any of the following processing operations:

(A1) Determining a color-difference direction of the calculated color difference, and selecting other representative colors existing in the color-difference direction from the peripheral background region.

(A2) If a representative color suitable for the color-difference direction of the calculated color difference does not exist, adding and selecting an appropriate representative color.

In step S816, if there is a limit on the number of representative colors, the representative color addition module 742, when adding a representative color, selects a representative color to be excluded and excludes the selected representative color. For example, the representative color addition module 742 performs any of the following processing operations:

(B1) Excluding a representative color with a minimum quantization conversion error among representative colors other than the representative color to be added and other than the peripheral background color.

(B2) Excluding a representative color with a minimum frequency of use (color that is used least frequently after the color quantization) among representative colors other than the representative color to be added and other than the peripheral background color.

(B3) Excluding the representative color closest to the representative color to be added among representative colors other than the representative color to be added and other than the peripheral background color.

In step S818, the color quantization module 750 changes the color of the embedded-information region to the selected representative color.

In step S820, the color quantization module 750 performs normal color quantization or binarization.

Figure 9:
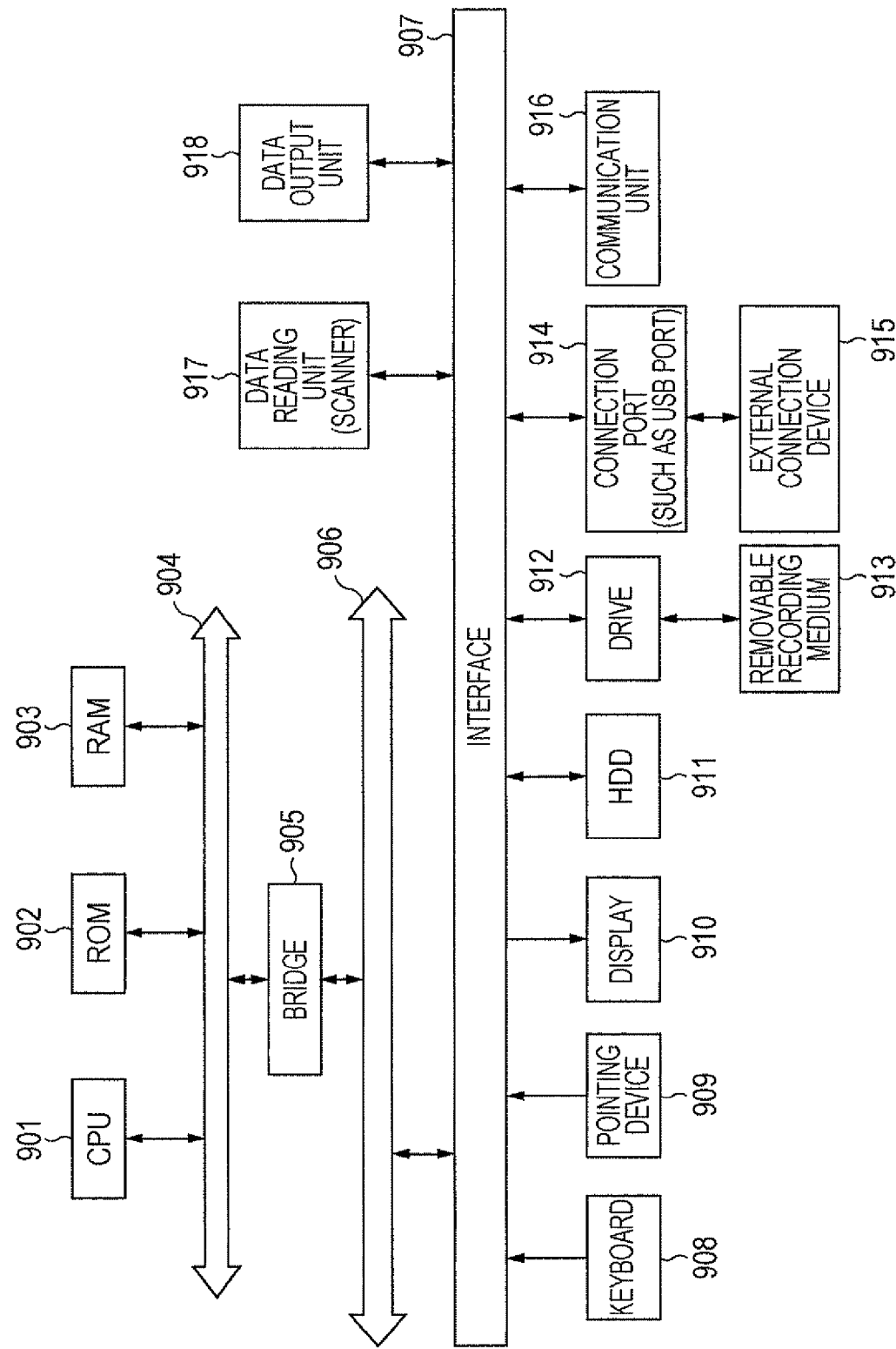
FIG. 9 is a block diagram illustrating an example hardware configuration of a computer that implements the image processing apparatus according to any of the exemplary embodiments.

An example hardware configuration of the image processing apparatus according to any of the first to third exemplary embodiments will be described with reference to FIG. 9. The apparatus illustrated in FIG. 9 may be implemented by, for example, a personal computer (PC), and FIG. 9 illustrates an example hardware configuration including a data reading unit 917 such as a scanner and a data output unit 918 such as a printer.

A central processing unit (CPU) 901 may be a controller that executes processing in accordance with a computer program describing the execution sequence of the various modules described in the foregoing exemplary embodiments, that is, the embedded-information region/color extraction module 110, the peripheral color extraction module 115, the representative color extraction module 120, the reproduction determination module 130, the color difference calculation module 132, the color difference reproduction determination module 134, the correction module 140, the representative color addition module 142, the color quantization module 150, the embedded-information region extraction module 510, the peripheral region extraction module 515, the color quantization module 550, the reproduction determination module 530, the color difference calculation module 532, the pixel value correction module 544, the peripheral color extraction module 715, the embedded-information reproduction/deletion determination module 725, and the color quantization module 750.

A read only memory (ROM) 902 stores items used by the CPU 901, such as programs and operation parameters. A random access memory (RAM) 903 stores programs to be executed by the CPU 901, parameters that change as appropriate during the execution by the CPU 901, and the like. The CPU 901, the ROM 902, and the RAM 903 are connected to one another via a host bus 904 such as a CPU bus.

The host bus 904 is connected to an external bus 906 such as a peripheral component interconnect/interface (PCI) bus via a bridge 905.

A keyboard 908 and a pointing device 909 such as a mouse are input devices which may be operated by an operator. A display 910 may be a liquid crystal display device, a cathode ray tube (CRT) display device, or the like, and is configured to display various kinds of information as text or image information.

A hard disk drive (HDD) 911 has a built-in hard disk and drives the hard disk to record or reproduce a program to be executed by the CPU 901 and information. The hard disk stores target images, representative colors, and so forth. The hard disk further stores various other computer programs such as data processing programs.

A drive 912 reads data or a program recorded on a removable recording medium 913 attached thereto, such as a magnetic disc, an optical disc, a magneto-optical disc, or a semiconductor memory, and supplies the read data or program to the RAM 903 connected thereto via an interface 907, the external bus 906, the bridge 905, and the host bus 904. The removable recording medium 913 is also available as a data recording region similar to a hard disk.

A connection port 914 is a port to which an external connection device 915 is to be connected, and has a connection unit based on a standard such as universal serial bus (USE) or Institute of Electrical and Electronics Engineers (IEEE) 1394. The connection port 914 is connected to the CPU 901 via the interface 907, the external bus 906, the bridge 905, the host bus 904, and the like. A communication unit 916 is connected to a communication line, and executes data communication processing with external devices. The data reading unit 917 may be, for example, a scanner, and executes document reading processing. The data output unit 918 may be, for example, a printer, and executes document data output processing.

The hardware configuration of the image processing apparatus illustrated in FIG. 9 is merely an example configuration. The configuration of the foregoing exemplary embodiments is not limited to the configuration illustrated in FIG. 9 so long as to be capable of implementing the modules described in the foregoing exemplary embodiments. For example, some modules may be configured using dedicated hardware (such as an application specific integrated circuit (ASIC)), and other modules may be located in an external system and may be connected via a communication line. Alternatively, multiple systems each having the configuration illustrated in FIG. 9 may be connected to one another via a communication line and may operate in cooperation with one another. Furthermore, the system illustrated in FIG. 9 may also be incorporated in a copying machine, a facsimile machine, a scanner, a printer, a multifunctional device (or an image processing apparatus having at least two of functions such as scanner, printer, copy, and facsimile functions), or the like.

A program described herein may be provided in the form of being stored in a recording medium, or may be provided via a communication medium. In this case, for example, a computer readable medium storing the program described above may constitute an exemplary embodiment of the present invention.

The computer readable recording medium may be a computer readable recording medium storing a program, which is used for installation, execution, distribution, or the like of the program.

Examples of the recording medium include digital versatile discs (DVDs) including discs complying with a DVD Forum standard, such as DVD-Recordable (DVD-R), DVD-Rewritable (DVD-RW), and DVD-RAM discs, and discs complying with a format supported by the DVD+RW Alliance, such as DVD+R and DVD+RW discs, compact discs (CDs) including compact disc read-only memory (CD-ROM), CD-Recordable (CD-R), and CD-Rewritable (CD-RW) discs, a Btu-ray Disc (registered trademark), a magneto-optical (MO) disk, a flexible disk (FD), a magnetic tape, a hard disk, a ROM, an electrically erasable programmable read-only memory (EEPROM), a flash memory, a RAM, and a Secure Digital (SD) memory card.

The above program or a portion thereof may be recorded in any of the above recording media for saving, distribution, or the like, or may be transmitted via communication using a transmission medium such as a wired network or a wireless communication network, which is used for a local area network (LAN), a metropolitan area network (MAN), a wide area network (WAN), the Internet, an intranet, an extranet, and the like, or a combination thereof, or carried on a carrier.

Furthermore, the program described above may be part of another program, or may be recorded on a recording medium together with a different program. The program may also be recorded separately on plural recording media. The program may also be recorded in any form being capable of restored such as compressed or encoded.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a first extraction unit that extracts from an image a region having an information image and a color of the information image, the information image representing information embedded in the image;
    a second extraction unit that extracts a color of a peripheral image surrounding the region extracted by the first extraction unit;
    a third extraction unit that extracts information necessary for color quantization processing to be performed on the image;
    a determination unit that determines whether or not a color difference that is a difference between the color of the information image extracted by the first extraction unit and the color of the peripheral image extracted by the second extraction unit falls within a predetermined range when color quantization processing is based on the information extracted by the third extraction unit;
    a correction unit that corrects a representative color if the determination unit determines that the color difference does not fall within the predetermined range, the representative color being representative of a color of an image that has been subjected to color quantization processing; and
    a color quantization unit that performs color quantization processing on the image on the basis of the representative color corrected by the correction unit.

2. The image processing apparatus according to claim 1, wherein the predetermined range is defined by
    a region that extends from the color of the peripheral image up to a distance greater than a first distance or up to a distance greater than or equal to the first distance, the first distance being determined in advance in a color-difference direction,
    a region that extends from the color of the peripheral image up to a distance less than a second distance or up to a distance less than or equal to the second distance, the second distance being determined in advance in the color-difference direction, and
    a region that extends from the color of the peripheral image up to a distance less than a third distance or up to a distance less than or equal to the third distance, the third distance being determined in advance in the color-difference direction and a direction perpendicular to the color-difference direction.

3. The image processing apparatus according to claim 1, wherein the correction unit adds a representative color to colors in the predetermined range.

4. The image processing apparatus according to claim 1, wherein the correction unit changes a representative color that is at a short distance from the predetermined range to a color in the predetermined range.

5. The image processing apparatus according to claim 1, wherein
    if a representative color is included in a second range larger than the predetermined range by a given value, the correction unit changes a representative color that is at a short distance from the predetermined range to a color in the predetermined range, and
    if no representative colors are included in the second range, the correction unit adds a representative color to colors in the predetermined range.

6. The image processing apparatus according to claim 1, wherein the correction unit corrects a representative color only in the region having the information image.

7. The image processing apparatus according to claim 1, wherein
    if there is a limit on the number of representative colors, the correction unit, when adding a representative color, selects a representative color to be excluded and excludes the selected representative color.

8. The image processing apparatus according to claim 7, wherein the correction unit selects, as the representative color to be excluded, a representative color that is a representative color other than a representative color to be added and other than a representative color of the peripheral image and that is a representative color for which a difference between colors before and after color quantization processing is smallest.

9. The image processing apparatus according to claim 7, wherein the correction unit selects, as the representative color to be excluded, a representative color that is a representative color other than a representative color to be added and other than a representative color of the peripheral image and that is a representative color which is used infrequently after color quantization processing.

10. The image processing apparatus according to claim 7, wherein the correction unit selects, as the representative color to be excluded, a representative color that is a representative color other than a representative color to be added and other than a representative color of the peripheral image and that is a representative color close to the representative color to be added.

11. The image processing apparatus according to claim 1, wherein the correction unit does not correct the representative color and interpolates the region having the information image with the color of the peripheral image
    if the number of representative colors is less than a predetermined threshold value or is less than or equal to the predetermined threshold value,
    if a difference between colors before and after color quantization processing is greater than a predetermined threshold value or is greater than or equal to the predetermined threshold value, or
    if the color quantization processing is processing for quantization to black and white.

12. The image processing apparatus according to claim 1, wherein the second extraction unit extracts the color of the peripheral image if the extracted peripheral image is a plain-color image, if the extracted peripheral image has a lightness higher than a predetermined threshold value or has a lightness higher than or equal to the predetermined threshold value, if the extracted peripheral image is a ground-color image, or if the extracted peripheral image is a white-color image.

13. The image processing apparatus according to claim 1, wherein the second extraction unit extracts the color of the peripheral image if the extracted peripheral image has a color having predetermined color components, the number of which is less than a predetermined threshold value or less than or equal to the predetermined threshold value.

14. An image processing apparatus comprising:
- a first extraction unit that extracts from an image a region having an information image representing information embedded in the image;
- a second extraction unit that extracts a peripheral region surrounding the region extracted by the first extraction unit;
- a third extraction unit that extracts information necessary for color quantization processing to be performed on the image;
- a color quantization unit that performs color quantization processing on the image in accordance with the information extracted by the third extraction unit;
- a determination unit that determines whether or not a color difference that is a difference between a color of the region of the information image extracted by the first extraction unit and a color of the peripheral region extracted by the second extraction unit falls within a predetermined range in an image which has been subjected to color quantization processing by the color quantization unit;
- a correction unit that corrects a representative color if the determination unit determines that the color difference does not fall within the predetermined range, the representative color being representative of a color of an image that has been subjected to quantization processing; and
- an image correction unit that corrects the image which has been subjected to color quantization processing by the color quantization unit, on the basis of the representative color corrected by the correction unit.

15. A non-transitory computer readable medium storing a program causing a computer to execute a process for performing image processing, the process comprising:
- extracting from an image a region having an information image and a color of the information image, the information image representing information embedded in the image;
- extracting a color of a peripheral image surrounding the extracted region;
- extracting information necessary for color quantization processing to be performed on the image;
- determining whether or not a color difference that is a difference between the extracted color of the information image and the extracted color of the peripheral image falls within a predetermined range when color quantization processing is based on the extracted information;
- correcting a representative color if it is determined that the color difference does not fall within the predetermined range, the representative color being representative of a color of an image that has been subjected to color quantization processing; and
- performing color quantization processing on the image on the basis of the corrected representative color.

16. A non-transitory computer readable medium storing a program causing a computer to execute a process for performing image processing, the process comprising:
- extracting from an image a region having an information image representing information embedded in the image;
- extracting a peripheral region surrounding the extracted region;
- extracting information necessary for color quantization processing to be performed on the image;
- performing color quantization processing on the image in accordance with the extracted information;
- determining whether or not a color difference that is a difference between a color of the extracted region of the information image and a color of the extracted peripheral region falls within a predetermined range in an image which has been subjected to color quantization processing;
- correcting a representative color if it is determined that the color difference does not fall within the predetermined range, the representative color being representative of a color of an image that has been subjected to quantization processing; and
- correcting the image which has been subjected to color quantization processing, on the basis of the corrected representative color.

* * * * *